(12) United States Patent
Kennedy et al.

(10) Patent No.: US 7,085,590 B2
(45) Date of Patent: Aug. 1, 2006

(54) MOBILE TERMINAL WITH ERGONOMIC IMAGING FUNCTIONS

(75) Inventors: Peter J Kennedy, San Jose, CA (US); Laurie A. Gray, Holly Springs, NC (US); Elisabeth Gibbons, Cary, NC (US); David Desmond Middleton, Morrisville, NC (US); James Cunningham, Raleigh, NC (US); Stacy Smith, West Midlands (GB); Amy Swanson, Apex, NC (US); David C. Bates, Cary, NC (US)

(73) Assignee: Sony Ericsson Mobile Communications AB (SE)

( * ) Notice: Subject to any disclaimer, the term of this patent is extended or adjusted under 35 U.S.C. 154(b) by 128 days.

(21) Appl. No.: 10/708,410

(22) Filed: Mar. 1, 2004

(65) Prior Publication Data

US 2005/0143124 A1 Jun. 30, 2005

Related U.S. Application Data

(60) Provisional application No. 60/533,550, filed on Dec. 31, 2003.

(51) Int. Cl.
*H04M 1/00* (2006.01)

(52) U.S. Cl. ............. 455/556.1; 455/566; 455/575.1

(58) Field of Classification Search ......... 455/550.1, 455/575.1, 575.3, 556.1, 557, 344, 566; 348/207.99, 374, 375, 376, 333.11, 333.12
See application file for complete search history.

(56) References Cited

U.S. PATENT DOCUMENTS 6,731,952 B1 * 5/2004 Schaeffer et al. ......... 455/557

2001/0004269 A1    6/2001 Shibata et al.
2003/0125008 A1 *  7/2003 Shimamura ............. 455/344
2004/0027474 A1    2/2004 Aoyama et al.
2004/0233173 A1 * 11/2004 Bryant ..................... 345/169

(Continued)

FOREIGN PATENT DOCUMENTS

EP    1271897 A2    1/2003

(Continued)

OTHER PUBLICATIONS

Patent Abstracts of Japan, vol. 2003, No. 06, Jun. 3, 2004, & JP 2003 046610, Matsushita Electric Ind. Co., Ltd., (Feb. 14. 2003).

(Continued)

*Primary Examiner*—Sonny Trinh
(74) *Attorney, Agent, or Firm*—Moore & Van Allen, PLLC; Steven B. Phillips

(57) ABSTRACT

Mobile terminal with ergonomic imaging functions. The present invention, by way of example embodiments, provides for a mobile terminal with ergonomic imaging or camera functions. A single display can be used, for example in portrait mode while terminal functions are being used and in landscape mode while imaging functions are being used. The change between the two orientations can be accomplished automatically. In some embodiments, the capability is also provided to process an image for assignment to a terminal function, where the image has at least one display attribute that makes it at least partly unsuitable for use with the terminal function. The processing may include resizing, cropping, and/or rotating the image. This processing can be accomplished for example, so that a landscape image can be viewed conveniently in a portrait orientation.

13 Claims, 10 Drawing Sheets

U.S. PATENT DOCUMENTS

2004/0259590 A1* 12/2004 Middleton ............... 455/556.1
2005/0007467 A1* 1/2005 Battles et al. ............... 348/239
2005/0020325 A1* 1/2005 Enger et al. ............. 455/575.3
2005/0101358 A1* 5/2005 Carpenter ................ 455/575.1

FOREIGN PATENT DOCUMENTS

| EP | 1312999 A2 | 5/2003 |
|---|---|---|
| EP | 1330124 A2 | 7/2003 |

OTHER PUBLICATIONS

Sony Ericsson Mobile Communications AB, PCT/US2004/022492, International Search Report, dated Nov. 11, 2004.
Sony Ericsson Mobile Communications AB, PCT/US2004/022492, Written Opinion, dated Nov. 11, 2004.
Sony Ericsson Mobile Communications AB, PCT/US2004/022492, "International Preliminary Report on Patentability", (Feb. 2, 2006).

* cited by examiner

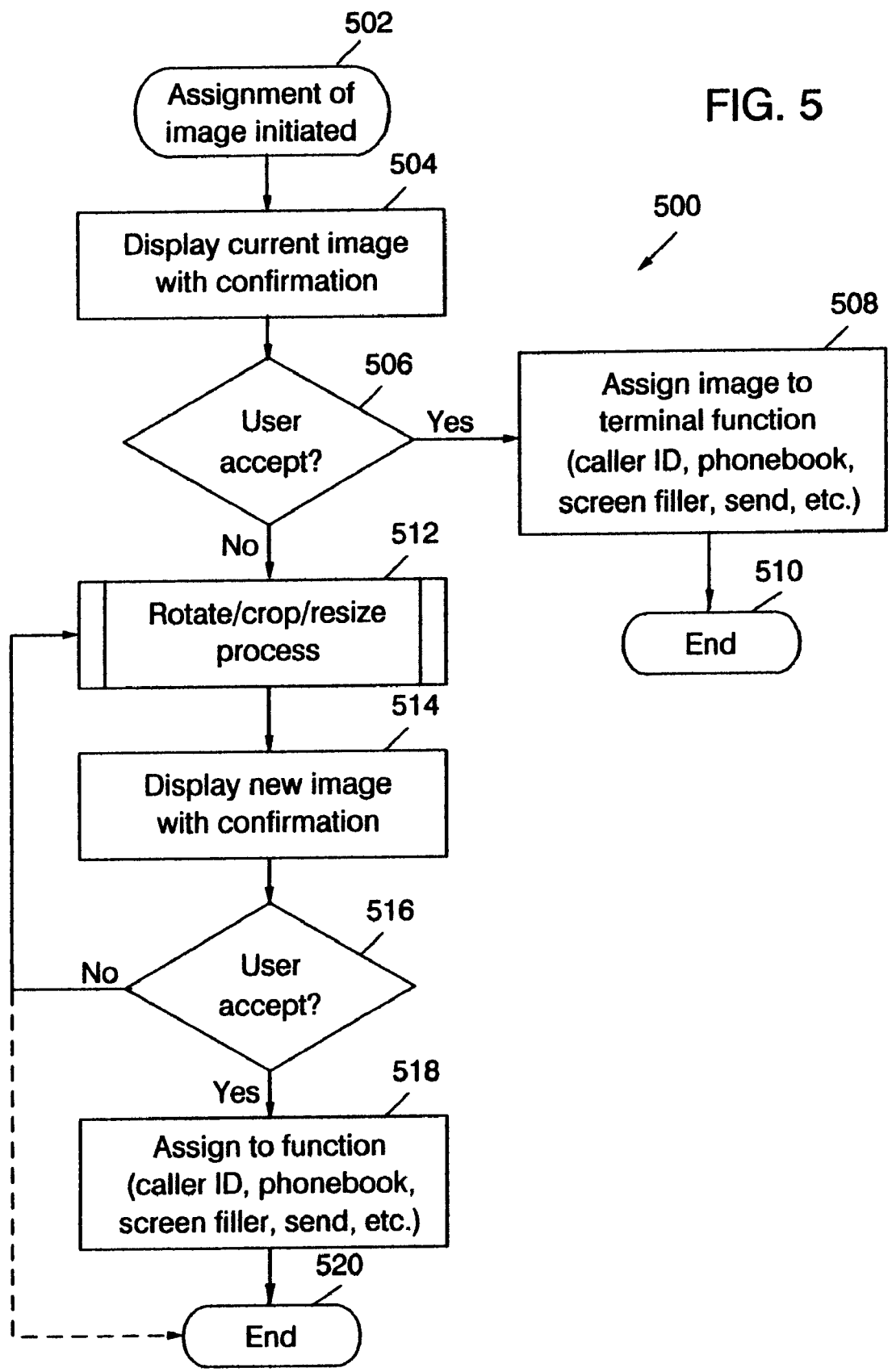

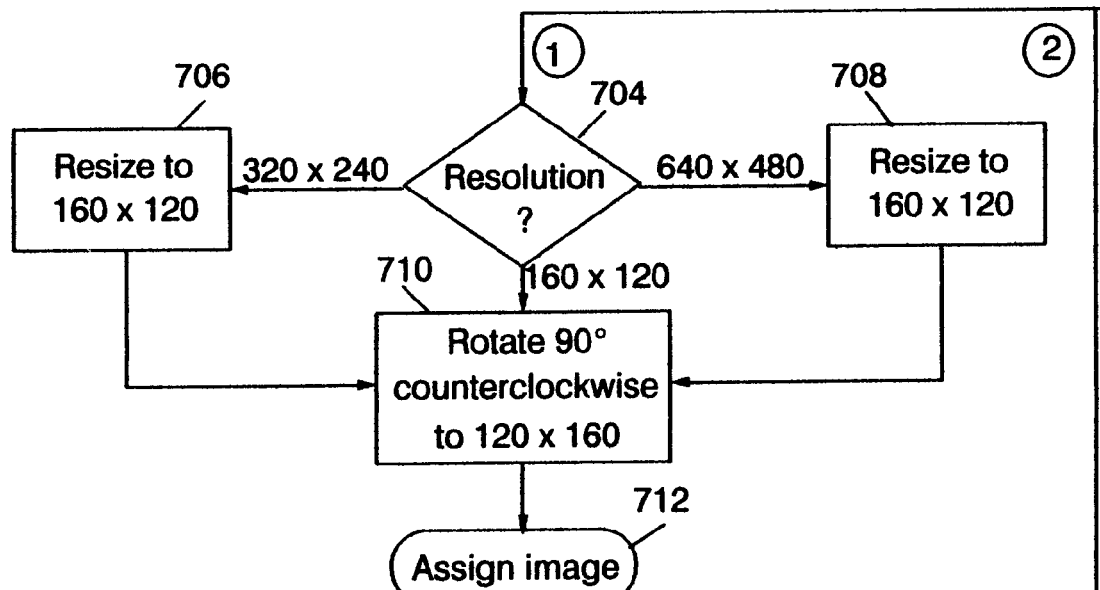
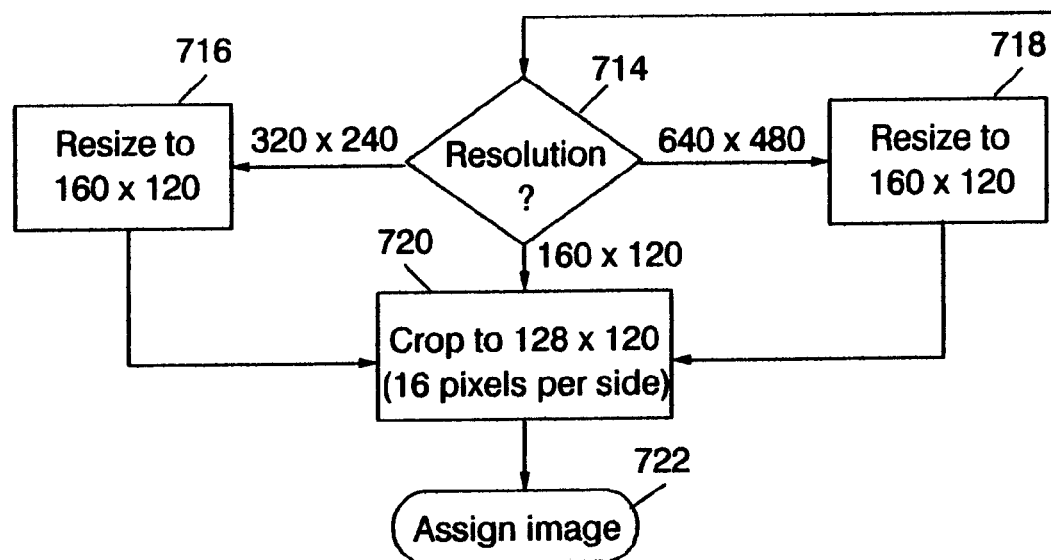
FIG. 7A

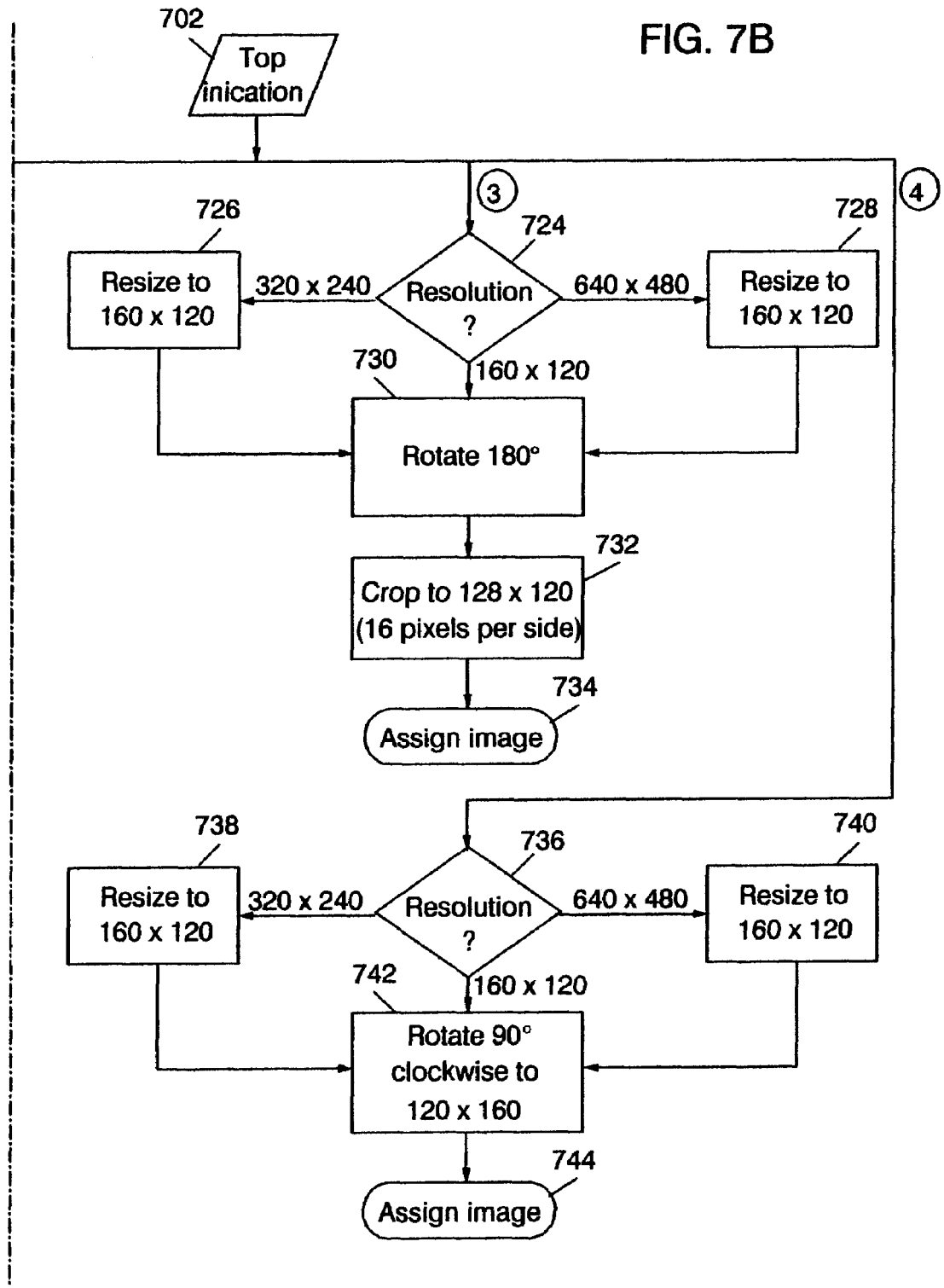

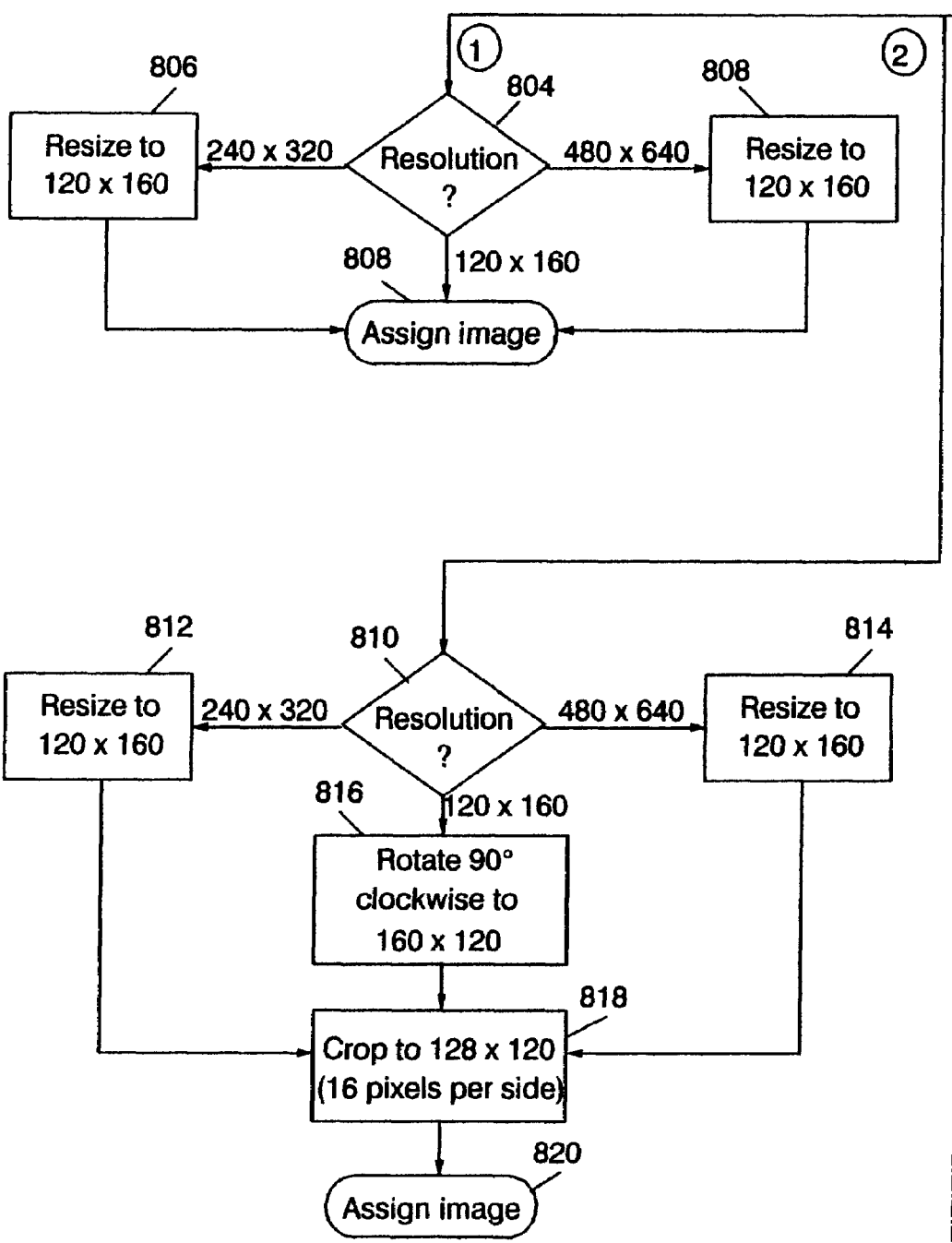

MOBILE TERMINAL WITH ERGONOMIC IMAGING FUNCTIONS

CROSS REFERENCE TO RELATED APPLICATIONS

This application is a non-provisional of and claims priority from U.S. provisional application Ser. No. 60/533,550 filed Dec. 31, 2003, which is currently pending and which is incorporated herein by reference.

BACKGROUND OF INVENTION

Wireless, mobile devices, such as phones, are continually evolving towards higher data rates and greater processing power. With these capabilities, an endless variety of functions and features can be realized. Recently, mobile phones have begun to proliferate which include basic, digital camera functions. However, the ergonomic characteristics of such mobile phones are generally optimized with respect to performing their primary function as a communication device. Soft keys, displays, and menus are oriented to optimize scrolling in the vertical direction. Mobile phone displays are normally used in the "portrait" orientation to facilitate scrolling through lists of items such as phone book entries.

Film and television cameras however, have traditionally been designed to capture images in a "landscape" orientation. In landscape orientation, the display's largest dimension is along the horizontal axis, in contrast to "portrait" orientation, where the display's longest dimension is along the vertical axis. Film and television cameras have typically been designed to capture images in a 4:3 aspect ratio. However, other aspect ratios proliferate in imaging, for example, those used in so-called "anamorphic" films, and those used in so-called "panoramic" photographic prints. Due to a long history of consumer experience with cameras, including more modern digital cameras, there is a strong expectation among consumers that at least some images are to be captured and shown in a "landscape" orientation. This expectation conflicts with the design of mobile devices such as telephones and some other mobile communication devices.

SUMMARY OF INVENTION

The present invention, by way of example embodiments, provides for a mobile terminal with ergonomic imaging or camera functions. Such a mobile terminal can provide a user with a more traditional camera experience while allowing a single display to be used in portrait mode while terminal functions are being used and in landscape mode while imaging functions are being used. For example, the user interface can accommodate both phone operations and imaging functions in a convenient and seemless way.

In example embodiments, a mobile device is operable in at least both a terminal mode and an imaging mode. A user interface display is presented to a user, for example, via a visual display device such as a liquid crystal display (LCD). The user interface display may include soft keys. An operating mode for the mobile device is determined. A display orientation for the user interface display is set in accordance with the operating mode. The display orientation can be selected from at least a first orientation normally associated with the terminal mode of the device and a second orientation normally associated with the imaging mode of the device. The display orientation can be automatically reset to the other of the two orientations when the operating mode of the device changes. In some embodiments, provision can be made for the user to override the default display orientation by providing an indication, such as by pressing a soft key. In some embodiments, one orientation can be a portrait orientation and another orientation can be landscape orientation. The entire user interface display can be rotated and otherwise adjusted, or individual display elements can be manipulated. The operating mode of the mobile device can be determined by user input, by the position of a lens cover associated with an integrated or attached imaging device, by an orientation sensor, or in any other fashion, including the detection of the attachment and/or connection of a separate imaging device.

In some embodiments, the mobile device is a mobile terminal of the type that is commonly used as a mobile phone, or wireless data device. Such a device typically includes a radio block operable to provide an interface to a wireless communication network. Such a device also typically includes a processor which controls the functions of the device, according to program code stored within the mobile terminal or device.

In some embodiments, a mobile device operable to perform both imaging functions and terminal functions provides the capability of processing an image for assignment to a terminal function, where the image has at least one display attribute that makes it at least partly unsuitable for use with the terminal function. After receiving a user indication requesting that the assignment be made, the display attribute or attributes can be altered to make the image more suitable for use with the terminal function. This alteration can be accomplished with relatively little user interaction, in example embodiments, a user can simply indicate a specific area of the image on a display screen so that the device can ascertain, for example, where the top of the image is. An image can then be assigned to the terminal function, for example, a communication function such as a phone book function, a caller ID function, or a screen filler function.

The changing of the display attribute or attributes may include resizing, cropping, and/or rotating the image. This processing can be accomplished so that a landscape image can be viewed in a portrait orientation. This processing may make the image more suitable for use, for example, as a photograph associated with an individual in a phone book. Again, program code stored in the mobile device can use an internal processor to control the device to accomplish the necessary processing of the image. Thus, a user does not have to be overly concerned with using images that may have been captured with the mobile terminal in a different orientation than that typically used when performing terminal functions.

BRIEF DESCRIPTION OF DRAWINGS

In FIG. 1, the terminal is illustrated in two different orientations, shown in FIG. 1A and FIG. 1B.

FIG. 4 illustrates the mobile terminal in two different orientations, and with an image displayed two different ways as processed according to some embodiments of the invention. These various possibilities are illustrated in individual FIGS. 4A, 4b, and 4C.

FIG. 5 is another flow chart according to certain embodiments of the invention.

FIG. 6 illustrates the mobile terminal in two different orientations, and shows how a user would provide certain input to the mobile terminal. These orientations are illustrated in FIGS. 6A and 6B, respectively.

FIG. 7 is a flow chart illustrating some of the image processing according to some example embodiments of the invention.

DETAILED DESCRIPTION

Figure 1A:
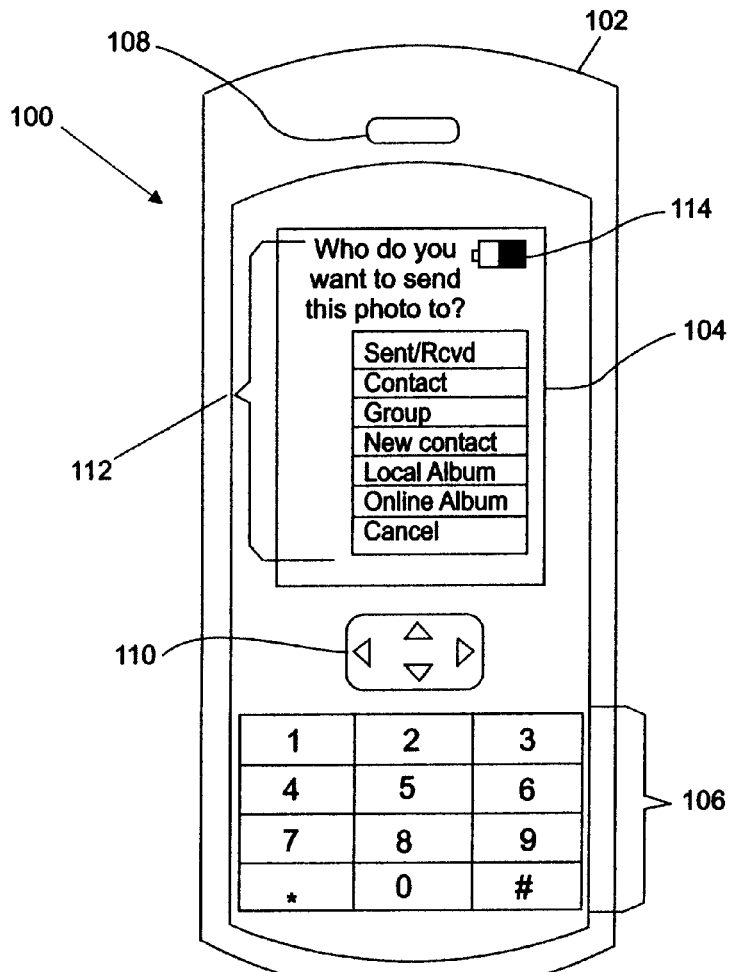
FIG. 1 is an illustration of a mobile terminal according to some embodiments of the invention.

The present invention will now be described in terms of specific, example embodiments. It is to be understood that the invention is not limited to the example embodiments disclosed. It should also be understood that throughout this disclosure, where a process or method is shown or described, steps of the method may be performed in any order or simultaneously, unless it is clear from the context that one step depends on another being performed first. Also, drawings and embodiments which illustrate the inventive concepts are not mutually exclusive. Rather, each example has been tailored to illustrate a specific concept discussed. In some cases, elements shown in a particular drawing coexist with others shown in a different drawing, but only certain elements or steps are shown for clarity. It should also be pointed out that references made throughout this disclosure to figures and descriptions using terms such as top, bottom, left, right, vertical, horizontal, etc., are used merely for convenience, and refer only to the relative position of features as shown from the perspective of the reader.

Some terminology used within this disclosure has its ordinary and customary meaning within the art. Otherwise, terms may be explained as they come up in the descriptions herein. However, it would be helpful to understand a few terms as specifically used herein. When a mobile device or terminal is referred to as having an "operating mode" what is meant is that the device is in a mode to be used as a camera, or a terminal, as the case may be. The terminal mode and terminal functions of devices according to embodiments of the invention are not, however, limited to a communication mode and communication functions. Mobile devices may have additional terminal functions including those related to acting as a voice recorder, music player, game console, and other devices, basically, any functions historically associated with computing terminals, mobile phones, or any other similar type of device having a processor. The term "orientation" is used in two respects. A "display orientation" refers to how visual information displayed on a device or terminal relates to the physical dimensions of the display device. A display device is a device such as a liquid crystal display or plasma display which may be present in a terminal or device which implements the invention. Display orientation is independent of the physical orientation of a mobile terminal or device as might be sensed by an accelerometer or other type of orientation sensor. A "user interface display" or "user interface" is meant to refer to an arrangement of display elements and possibly input elements on a screen of a display device. It is important to keep this term distinct from the terms referring to the display device itself. A "user indication" or "user input" refers to any way in which a user triggers device behavior. Such a user input or user indication might be direct, as in the case where a user indicates he or she wishes to send a message by hitting a "send" key. However, such an input or indication may also be indirect, in the sense that a user's wish is assumed from some other action the user takes, for example, turning a mobile terminal to a different physical orientation.

Embodiments of the invention will be disclosed herein in the context of a specific type of mobile device, a mobile terminal of the cellular telephone type, which includes imaging functions and communication functions. The communication functions and a communication mode of operation are but examples of terminal functions associated with a terminal mode of operation. The concepts of the invention are not limited to the specific embodiments described. In particular, the concepts can be applied regardless of the display technology, keypad technology, or type of housing used. The particular mobile device or terminal involved may be a personal communication system (PCS) terminal which can include data processing, facsimile, and data communication capabilities. As previously mentioned, the mobile device in which the invention is implemented can encompass personal digital assistants, Internet access devices, organizers, and computers.

FIG. 1 is an external view of a mobile terminal which can implement certain embodiments of the invention. More specifically, FIG. 1 illustrates mobile device 100. Mobile device 100 includes housing 102, which contains electronic components that are operable to transmit and receive radio telephone communications as is understood in the art. Housing 102 also contains components for operating an included display device, 104. The mobile terminal of FIG. 1 also includes a numeric keypad, 106. Opening 108 provides an aperture through which sound is projected. Above keypad 106, is a so-called "joystick" pad, 110. Such a pad is known in the art, and provides away to navigate up, down, left, and right, through menus and various screen elements. This particular example mobile device also includes an imaging system camera with a lens on the back of the phone (not shown).

Figure 1B:
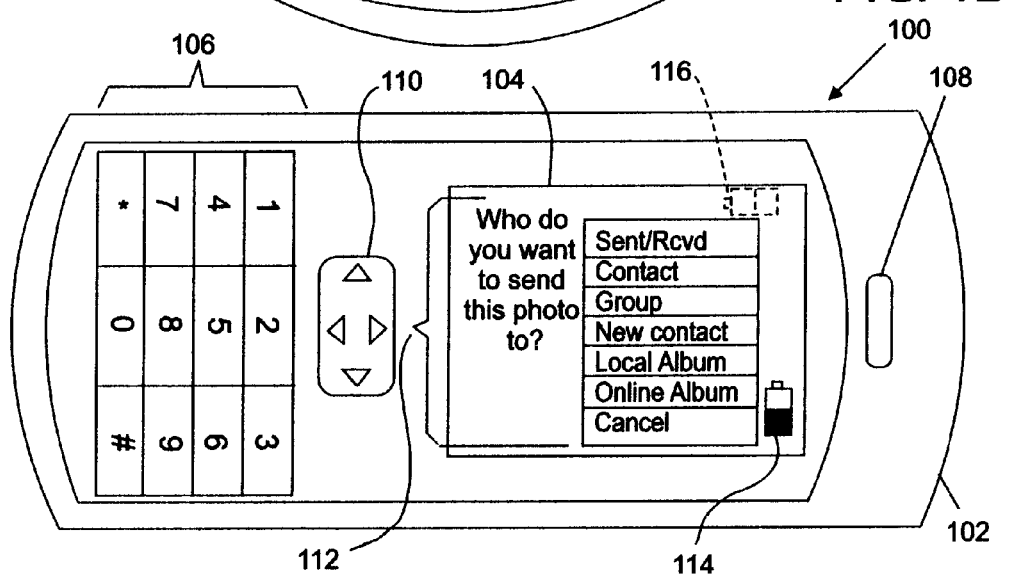

As shown in FIG. 1A, the mobile terminal has two elements contained within the user interface display. Element 112 is a question for the user which includes a menu of responses, which can be navigated through the use of joypad key 110. Element 114 is a battery indicator which indicates the state of an internal battery contained within the mobile device. A typical mobile terminal type device will include many screen elements. Only two are shown for clarity in illustrating the concepts about to be discussed. FIG. 1A presents a traditional "portrait" user interface implementation. Menu items may be "soft keys" or may consist of a menu which is navigated via a cursor, as is illustrated in the figure. In this example, when mobile device 100 is turned to an alternate physical orientation, for example, to a "landscape" orientation that might be used in conjunction with a built-in camera for an imaging function, text and menus, if they were static, could not be read easily without tilting one's head, or reorienting the terminal. Thus, according to some embodiments of the invention, the display orientation for the user interface display is altered in accordance with an operating mode change. This operating mode change, in this example, can be to an operating mode in which a "landscape" orientation of the display is desired. In this example, the display orientation changes from a portrait orientation in FIG. 1A, which is normally associated with a communication mode, to a landscape orientation in FIG. 1B, which is normally associated with an imaging or camera mode. Specifically, in this example, display element 112 has been re-rendered by the mobile device to be legible in a landscape orientation. In FIG. 1B, like reference numbers refer to the same elements as shown in FIG. 1A. Note that in this case the resetting of the display orientation involves orienting the individual display element, 112, in a normal visual orientation for a physical orientation of device 100 which results in a landscape display. Display element 114, the battery indicator, remains unchanged. Since the battery indicator makes as much sense in one orientation as another, it can be rendered the same way in either orientation, and does not need to be changed. It should be noted, however, that an alternative implementation would completely rewrite and rerender the entire user interface display, rather than individual elements. In such a case, the battery indicator would appear at position 116, as indicated by the dotted outline shown in FIG. 1B.

It should be noted that the menu structure itself, the soft keys, and the indicators in the display might also change along with the change in orientation of the user interface display. In this particular example of a mobile device, the primary task associated with a landscape camera application can be different than those typically used in the phone application, or in other communication functions. In such a case, a new menu may be required. These changes can be accommodated with the implementation of a grid-based system for rendering menu items and display elements.

Figure 2:
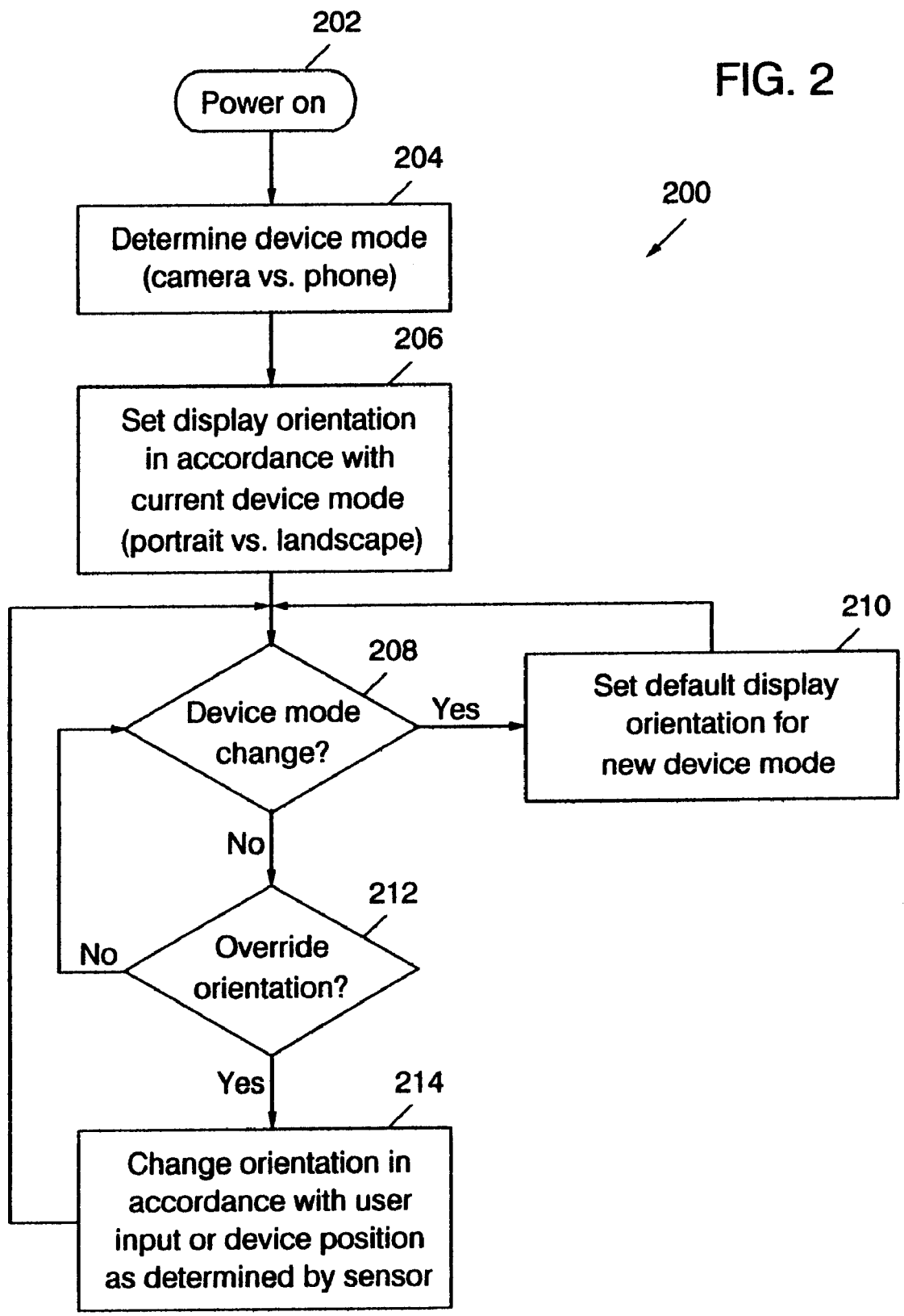
FIG. 2 is a flow chart which illustrates a method according to some embodiments of the invention.

FIG. 2 illustrates one example method for setting and resetting the user interface display orientation based on the operating mode of a mobile device or mobile terminal. FIG. 2 shows the method in flow chart form, in which each step or process is illustrated by a process block. Method 200 begins at block 202 when the mobile device is powered on. At block 204 the device operating mode is determined. This operating mode may be one of a camera mode and a phone mode in this example. At block 206, a display orientation is set in accordance with the current device mode. In this example, the possible display orientations are portrait and landscape. At this point, the mobile device monitors its operations to determine if a mode change occurs. If a mode change occurs at block 208, the display orientation is changed at block 210. Note that at both block 206 and block 210, a default display orientation can be selected. The default orientation can be set by a user in configuring the mobile device. Alternatively, the default orientation can be built into the device. Optionally, provision can be made for the user to override the default orientation on the fly, as shown at block 212. If the user does not override the default orientation, processing returns to block 208, and the device monitors for an operating mode change. If the user does decide to override the default orientation at block 212, the display orientation can be changed at block 214 in accordance with the user's indication.

In many cases, the display orientation selected can be those which are normally or ordinarily associated with the operating mode, for example, portrait display orientation for a communication mode and landscape display orientation for an imaging mode of the device. However, these orientations may be different for still other terminal modes, for example, a game mode, music player mode, etc. A determination as to the initial device mode at block 204, or a change in the device mode, at block 208, can be made in many ways with any of various types of inputs and apparatus. For example, a user can either directly or indirectly indicate the display orientation. In the case of a camera phone, the opening of a lens cover can activate a built-in switch which automatically notifies a processor in the device that the camera mode has been initiated. Alternatively, an orientation sensor can be used to determine when a user positions the mobile device in such a way as it is probable that the user wishes to take photographs. Thus, when a user holds the device up in landscape mode, with the imaging capability enabled, an orientation sensor notifies a processor within the mobile device or terminal that the user interface display needs to be rewritten for a landscape mode orientation. Small solid state orientation sensors are available from various sources, including ST Microelectronics Group of Geneva, Switzerland. At least some such sensors use accelerometers and have digital outputs. Additionally, some mobile phones use a camera attachment, which is available as an accessory item. The connection of such an attachment can also be an indication of a mode change.

Figure 3:
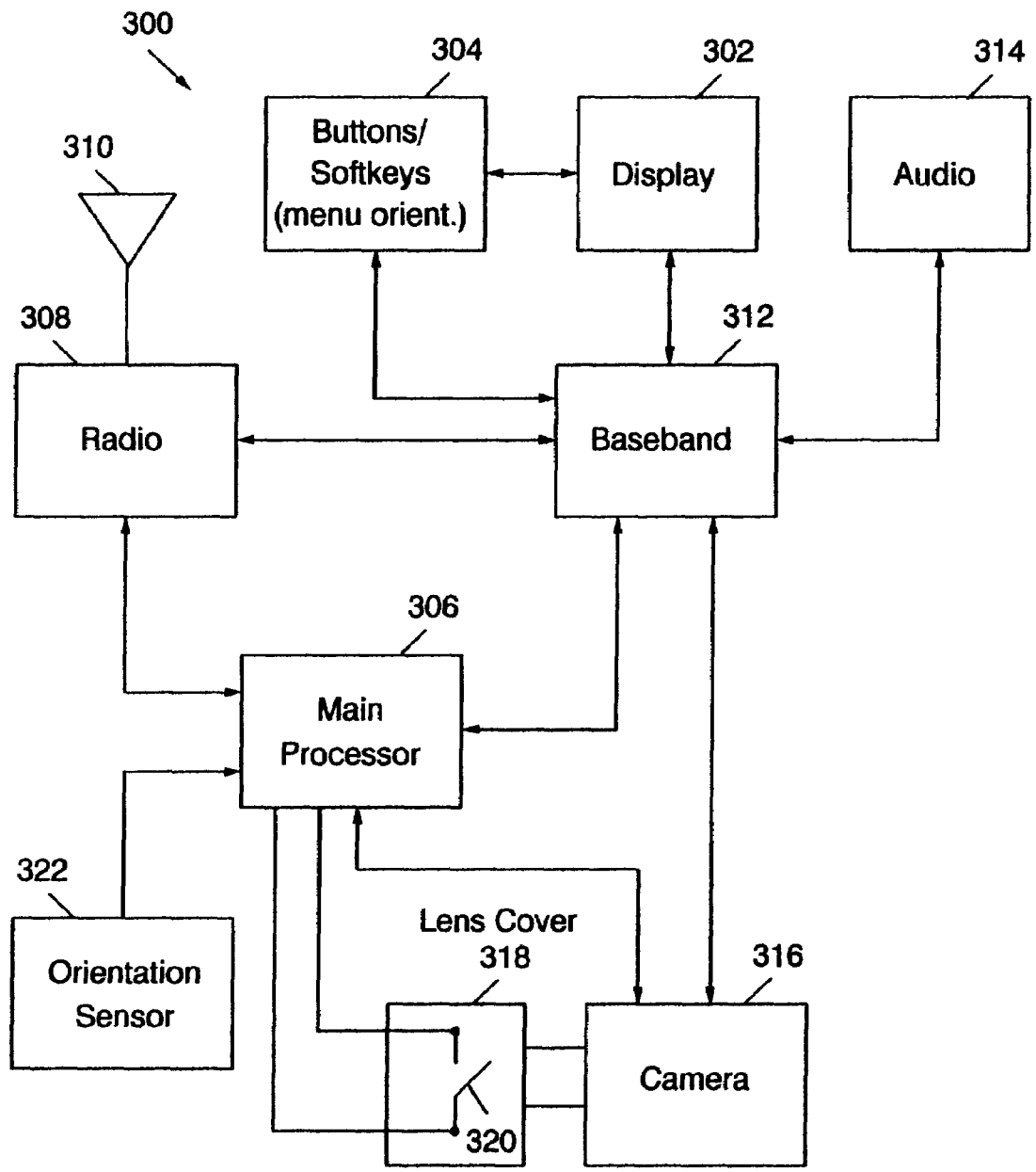
FIG. 3 is a block diagram of a mobile device according to some embodiments of the present invention.

FIG. 3 is a functional block diagram of the hardware components of a mobile terminal which can implement some embodiments of the invention. FIG. 3 includes the components which implement the means to carry out at least some of the processes specifically described herein, as well as other functions typically associated with a mobile device of the mobile radio telephone device. Mobile terminal 300 can include display 302 and input block 304. These two blocks in conjunction may be used to implement soft keys, otherwise, input block 304 can include traditional buttons using any technology. Input block 3 or 4 may include buttons, soft keys, or touch screen menus. The main processor platform 306, controls the overall operation of the terminal. This platform includes a processor which controls many of the functions of the phone. This platform can also include computer code in the form of firmware, microcode, software, etc. which uses the processor to execute various functions on the terminal. Mobile terminal 300 of FIG. 3 also includes radio block 308 which provides an air interface to a wireless communication network in this example. The terminal's antenna system, 310, is connected to radio block 308. Baseband logic block 312 provides basic signal processing, for example, synchronization, channel coding, decoding, and burst formatting, as is understood in the art. Audio interface block 314 handles voice as well as analog to digital processing. It also receives input through a microphone and produces output through a speaker in the case of a mobile terminal device as is illustrated in this example. Baseband block 312 also performs some of the processing images received through an imaging device, in this example, camera 316.

As previously discussed, various methods and apparatus may be used to determine the operating mode, and hence the appropriate display orientation, for a mobile device according to embodiments of the invention. User input via block 304 has already been discussed with reference to FIG. 3. Camera 316 may also include lens cover 318. This lens cover has a built-in switch, 320, which reports the status of the lens cover to the main processing platform, 306. A lens cover of this type typically slides open on molded or metallic tracks, as is known in the art. The processor at 306 can be informed of the status of the lens cover via switch 320, and act accordingly. Thus, it can be assumed that when the lens cover is open, the mobile device is in camera mode. As previously discussed, provision can be made for a user to override this default provision via input through block 304. Optionally, orientation sensor 322 can be connected to provide input to a processor in the mobile terminal. The type of sensor used has been previously discussed. It is important to recognize that these various techniques for making a determination as to an operating mode or position of the phone are not mutually exclusive. Rather, these and others can be combined within a single mobile device. For example, the main processor in the mobile terminal may assume a camera mode is selected when the lens cover is open, but only in the case where the orientation sensor indicates a landscape orientation for the mobile device. Note also that camera 316 can be a separate attachment.

The discussion herein has heretofore been centered primarily on making it more convenient for a user to use a combination communication and imaging device in a way that is more consistent with typical imaging use, namely, with a landscape or other orientation for the display that is more suitable for capturing images. Another aspect to embodiments of the present invention as disclosed herein is handling of the images once they are captured and stored. A challenge can be presented when the primary image capture method relies on a different orientation from that used for terminal functions. When a user captures an image in landscape orientation and desires to assign the image to, for example, a communication function, the image may appear with an incorrect orientation, size, or other display attribute for use with the terminal function. In a typical mobile device which functions as a mobile terminal having both telephone and imaging functions, such terminal functions can include, but are not limited to, a screen filler function, and communication functions such as a phonebook function, a caller ID function, and a send function. A screen filler function is any function in which an image is used to substantially fill the screen. For purposes of this disclosure a screen filler function can be considered a terminal function, even if the screen filler is used or visible during the imaging function itself. Screen filler functions can include "wallpaper" functions, and screen saver functions. A send function refers to the communication function of forwarding the image to another user via the network. The phonebook function and the caller id function are often tied together. Nevertheless, the phonebook function refers to a function which allows an image to be assigned to an entry in the phonebook. The caller ID function refers to assigning an image to a specific caller id, so that an image of the caller is displayed when the call is received. As previously mentioned, these functions are often tied together in that the caller ID function within a mobile phone relies on a phonebook to display caller ID information.

In example embodiments of the present invention, a user interface is designed to provide a method for the user to direct the handling of the captured image so that display attributes are adjusted to make the image more suitable for use with a terminal function to which the image is to be assigned. in some embodiments, a user may be freed from step-by-step, repetitive, and frustrating tasks involving manipulating multiple display attributes such as size, aspect ratio, orientation, and how the image is cropped. In some embodiments, soft keys which are overlaid on a displayed image can assist the user.

Figure 4A:
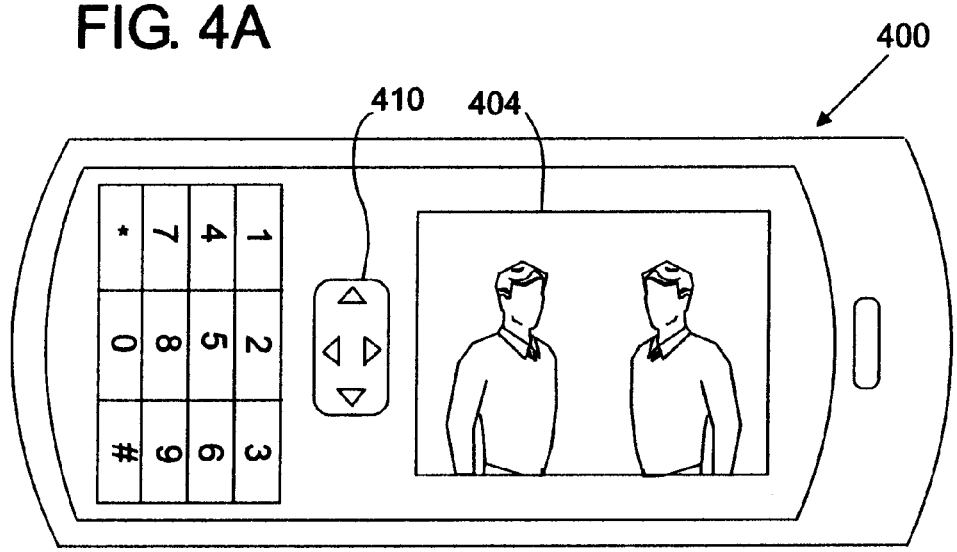
FIG. 4 is another illustration of a mobile terminal according to some embodiments of the invention.

FIG. 4 is an external view of mobile device 400, a mobile terminal of the wireless telephone type. As before, this mobile terminal includes an imaging device, and visual display 404. The mobile terminal also includes joystick button 410. The other various external elements of mobile terminal 400 are well known and essentially the same as that previously described with respect to FIG. 1, and so will not be described again in detail.

Figure 4B:
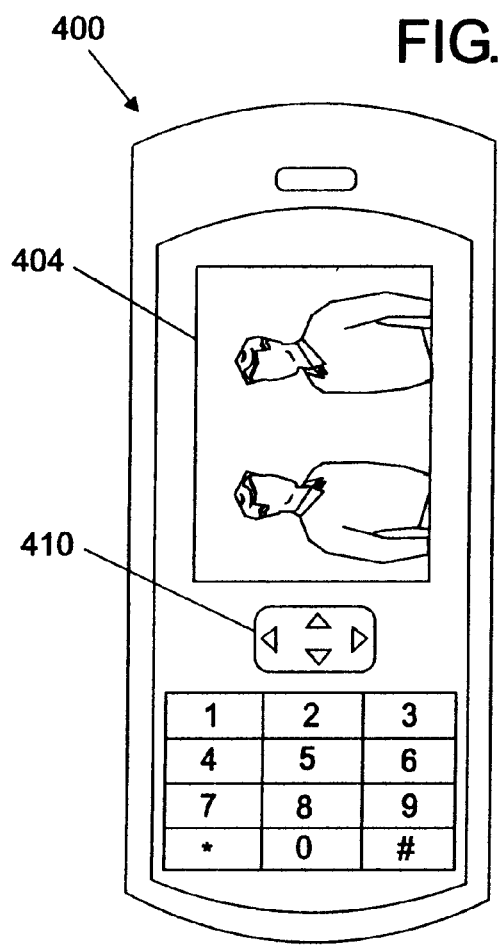
Figure 4C:
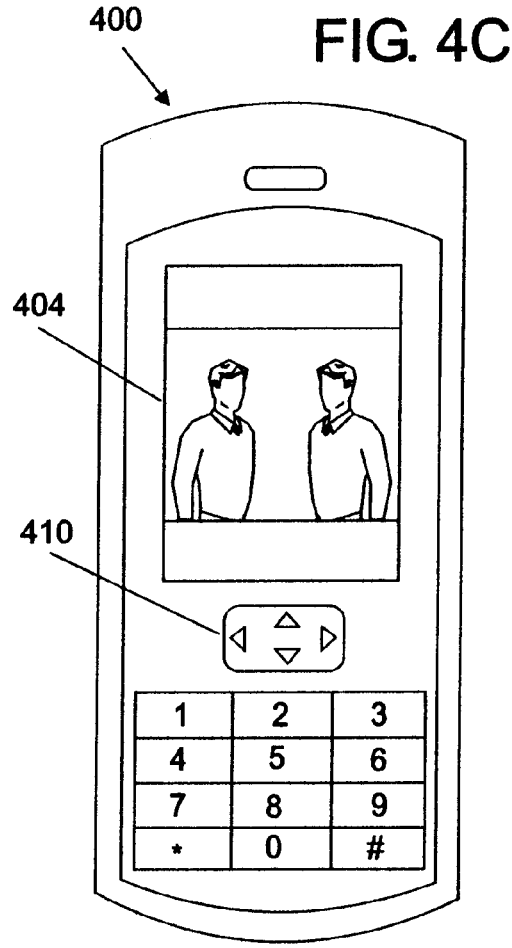

Mobile terminal 400 is currently displaying on visual display 404 an image of two individuals, which is shown schematically. This image was captured with the mobile terminal in the orientation shown in FIG. 4A, so that the display is in a landscape orientation. In FIG. 4B, a user has rotated the phone into the position where the display is in a portrait orientation. In this example, a user wishes to assign the image to a terminal function. In FIG. 4B, the image presented on visual display 404 appears incorrect; because it is displayed the way it was originally captured, the image appears sideways. In FIG. 4C, the image has been rotated, and in this case cropped, to be displayed in a more suitable fashion for use when visual display 404 is in a portrait orientation. As will be discussed below, joystick button 410 can be used by a user to provide an indication of the location of a specific area of the image, wherein said indication on visual display screen 404 is used to process the image to be more suitable for use with the terminal function.

FIG. 5 provides an illustration, in flow chart form of a process for interacting with a user to process an image for assignment to a terminal function. In typical fashion, process 500 includes a plurality of process blocks which describe steps or sub-processes according to this example embodiment. At block 502 a first user indication requesting that an image be assigned to a terminal function is received by the mobile device. In this example, an image may have one or more display attributes which make it at least in part unsuitable for use with the terminal function. At block 504, the current image is displayed with a request for user confirmation. If the user accepts the image as is at block 506, the image is assigned to the appropriate communication terminal function at block 508. In this case, the process ends at block 510. If the user does not accept the image at block 506, a process of altering at least one, and possibly more display attributes can be initiated by the mobile device at block 512. In example embodiments, this process involves altering the display attribute or display attributes of the image using a second user input which indicates the location of a specific area of the image on a display screen or visual display device. As will be discussed below, this indication may be provided via a soft key overlay. However, this indication can also be provided by use of the joystick pad, or other buttons on a mobile terminal. At block 514, the newly processed image is displayed and a user is asked for confirmation. If the user accepts the newly processed image at block 516, it is assigned to the appropriate function at block 518. The process then ends at block 520. Optionally, the user can cancel the operation at that point and end the process, as shown by the dotted arrow between block 516 and block 520. It should be noted that the option to cancel processing could be available continuously on the display screen. Menu structures of this type are well-known and so this option has not been described in great detail. It is omitted from FIG. 5 for clarity.

As described above, in example embodiments of the invention, a first indication can be received by the mobile device which indicates that the user requests the image to be assigned to a terminal function. In example embodiments, a second indication is then received which relates to identifying a specific portion of the image so that the mobile device, through use of its processor and program code, can process the image appropriately. This processing can handle one or many display attributes. For example, a handset display may display pictures in landscape orientation in a resolution of 160×120 pixels. However, the image may have been captured in a resolution of 640×480 pixels, or some other resolution. thus, resizing may be necessary. Resizing of electronic images is typically accomplished by a sampling process, as is known in the art, and will not be discussed in great detail. Additionally, when a landscape picture is to be displayed in portrait mode, the image must be resized in order to fit the portrait display. If distortion is to be avoided, and in some cases if the hardware or software image scaling capability is linearly limited, the landscape image presented in portrait mode can be cropped by, for example, 16 pixels on each side and displayed with bands at the top and bottom of the image. These bands can be displayed in the default background color of a current theme or profile stored in a mobile telephone or similar mobile device. It is also possible to program the phone so that the image is re-scaled so that the bands at the top and bottom of the image do not appear, and more pixels are cropped off the sides. Various options for this process can be programmed into the phone by the manufacturer, or can be set by the user in an image processing settings menu.

A description of an example process by which display attributes are altered for assignment to a terminal function will now be provided. It is important to recognize that camera hardware contained within a mobile device may store captured images in a number of different ways. If images are stored in a landscape orientation, as previously discussed, it may not be practical to assume on which side the device will be turned to capture an image. Thus, images stored in a portrait orientation can be stored in either of two orientations, one being 180° rotated from the other. A camera application may also be designed to store the image in a portrait orientation. This may be so even though the image is actually captured in a landscape orientation. Although it is probably not typical that an image will be captured in portrait orientation with the mobile device turned "upside-down" relative to its normal operating position, accounting for this possibility as part of the image processing may be beneficial to users in some circumstances. Thus, the second user input discussed above, which indicates the location of a specific area of the image being displayed, can be used to correct the image for assignment to a terminal function regardless of how the image is stored.

Figure 6A:
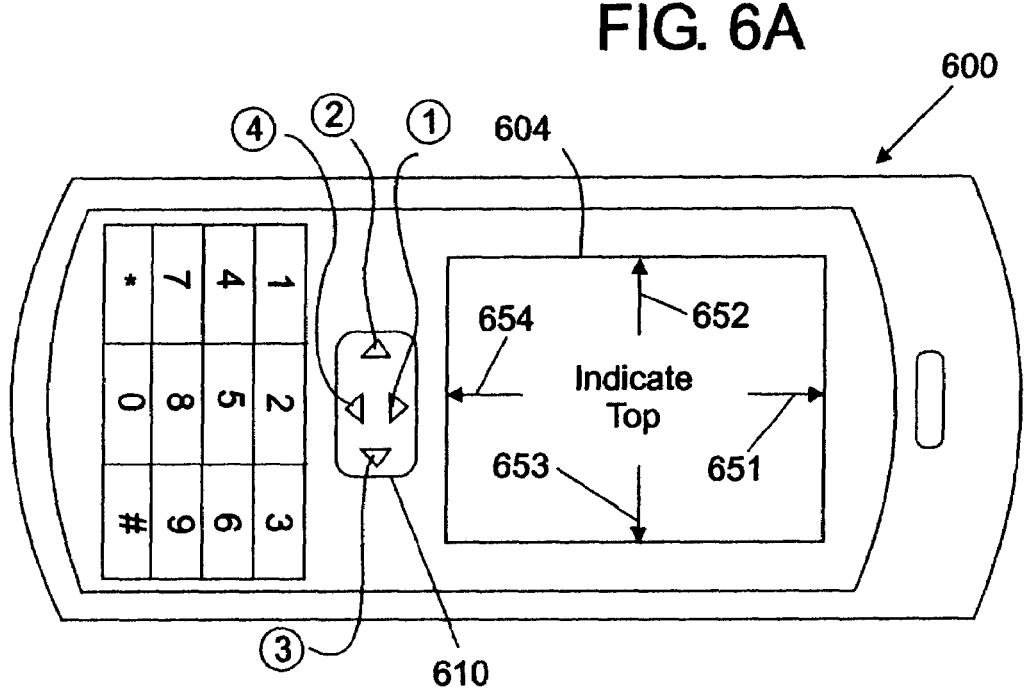
FIG. 6 is another illustration of a mobile terminal according to example embodiments of the invention.
Figure 6B:
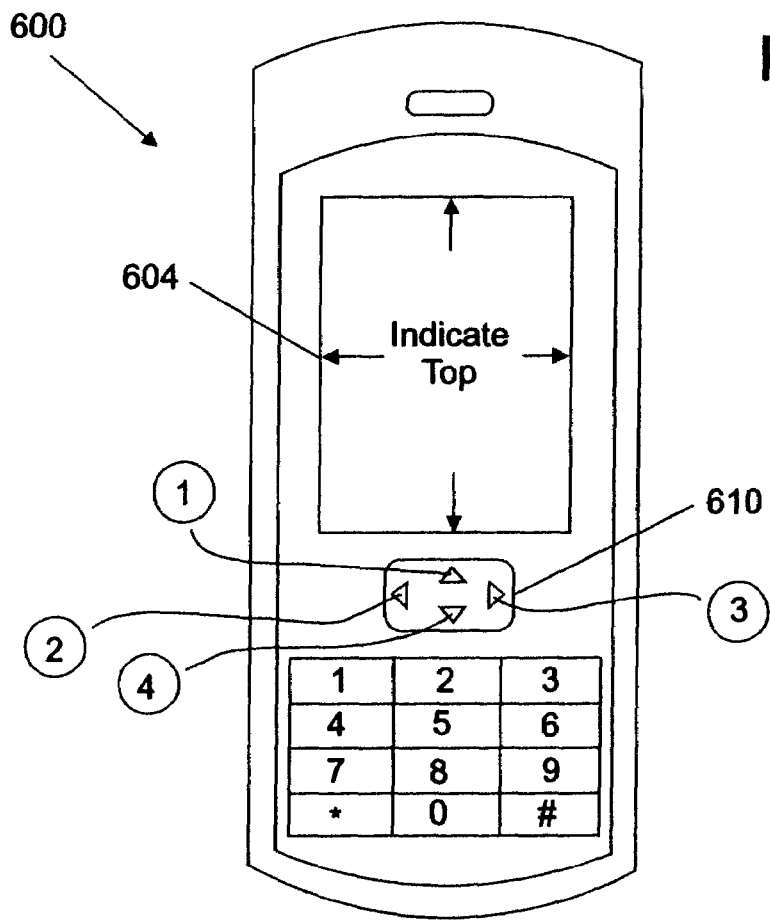

FIG. 6 illustrates how a user input indicating the location of a specific area of the image is received by the mobile device. In this particular embodiment, a user can indicate where the top of the image is on the display screen. A mobile device can be designed that allows a user to indicate the bottom, left, right, or even a corner of the image or that allows a user to set in a settings menu which part of the image will be indicated when an image is processed. FIG. 6A illustrates mobile device 600. It can be assumed that an image is being displayed on display screen 604. This image is not rendered in the actual drawing for clarity. A menu overlay is shown over the image in FIG. 6A. This menu overlay appears correct to the user with mobile terminal 600 in a "landscape" orientation. The overlay includes the instruction "indicate top" which is presented to the user. Arrows 651, 652, 653, and 654 are also graphically presented on the screen. Each corresponds to a side of the image. The user provides input to indicate which side of the image is visually, the top of the image. This user input can be received by the user pointing to one of the arrows in an implementation where the arrows are actual soft keys. Alternatively, a user can use the joystick button, 610, to indicate which of the arrows is pointing to the top of the image. The joystick button is labeled with numbers and circles, to correspond to flow directional indicators which are used in the following flow charts. Number 1 corresponds to arrow 651. Number 2 corresponds to arrow 652. Number 3 corresponds to arrow 653. Number 4 corresponds to arrow 654. As before, all of the various components and external features of the phone are as previously illustrated and are not described again. FIG. 6B illustrates mobile terminal 600 after it has been rotated. In this particular example, the overlay which includes the instructions to the user "indicate top" and the directional arrows has been rewritten to be readable in the new orientation. This process can be accomplished using the orientation sensor as previously described, or with user input to indicate that a user desires to have the overlay redrawn in portrait orientation. The flow numbers on the joystick button are in the same relative positions to the arrows as before. Thus, a detailed description of the flow numbers and the directional arrows will not be repeated for FIG. 6B.

Figure 8B:
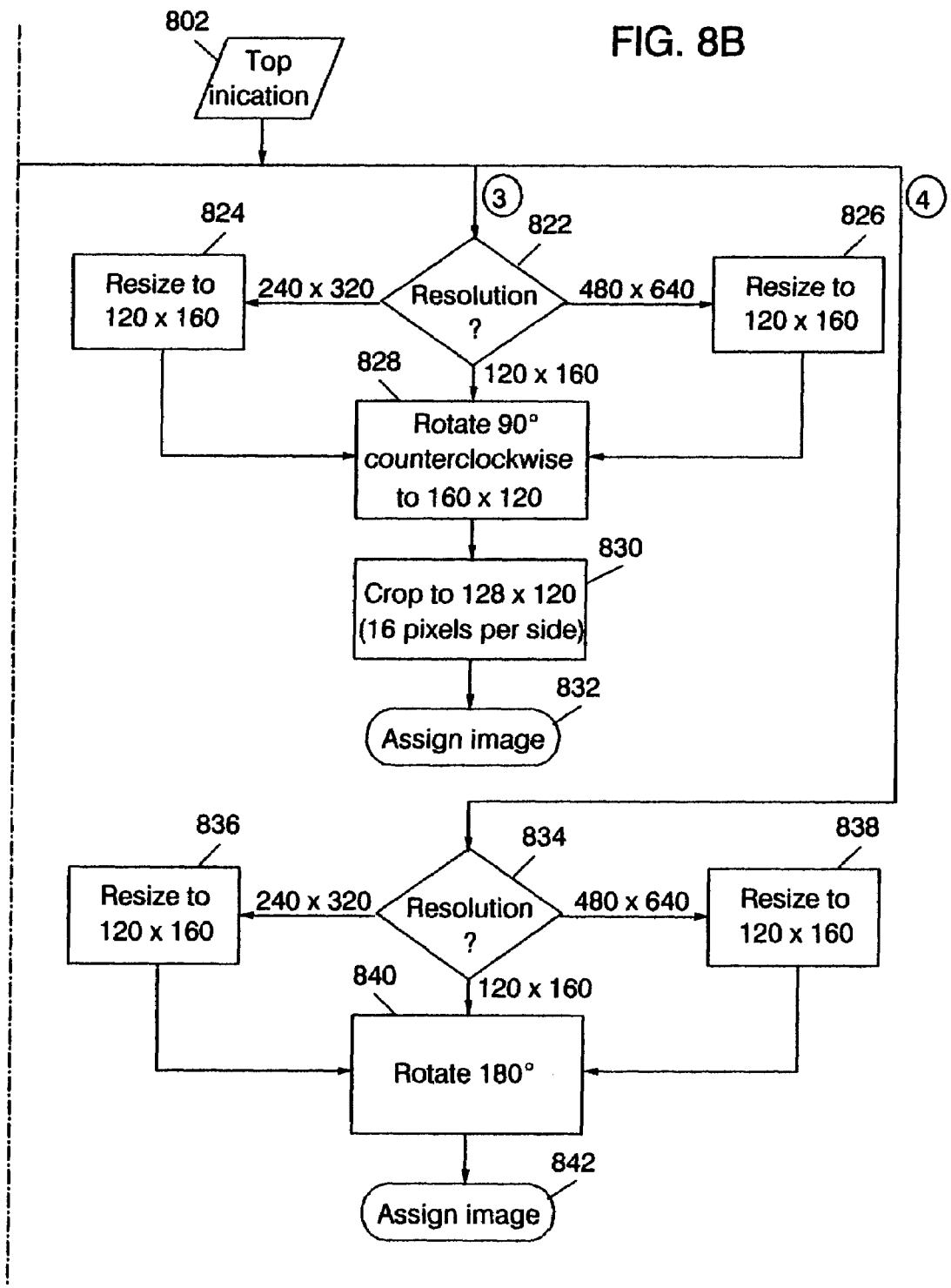
FIG. 8 is another flow chart illustrating image processing according to example embodiments of the invention.

FIGS. 7 and 8 are flowcharts indicating how an image is processed in order to change or adjust display attributes for assignment to a terminal function in a mobile device. FIG. 7 assumes that the image is stored in landscape, and that user desires to keep the image in landscape orientation for assignment to the terminal function. This may be the case, for example, where the mobile device in question operates with its terminal functions in landscape mode, as might be the case with a text terminal or e-mail device. It should also be assumed that for purposes of FIGS. 7 and 8, the desired image size for assignment to a terminal function is one where the short sides of the display correspond to 120 pixels. These assumptions are both being made in order to illuminate the examples herein. Mobile devices which make use of the invention may be designed in infinite ways, and the principles of the invention can be applied to various screen aspect ratios, resolutions, sizes, and orientations. Both FIGS. 7 and 8 are illustrated in flowchart form, with various process blocks indicating steps or sub-processes.

In FIG. 7, the indication as to the top of the image is received at block 702. At that point, processing branches to either branch 1, 2, 3, 4. These numbers are shown in circles to distinguish them from reference numbers. They correspond to the circled numbers, which reference the joystick button, 610, of FIG. 6. In branch 1, a check is made at 704 as to the resolution of the image. If the stored resolution is 320×240 pixels, it is resized to 160×120 pixels at block 706. Likewise, if the stored resolution is 640×480 pixels, it is resized to 160. 120 pixels at block 708. If the stored resolution is already 160×120 pixels it is not resized. Whether it is resized or not, and regardless of the amount, in this example embodiment it is rotated counter-clockwise 90°, so that its resolution is now 120×160 pixels. This rotation occurs at block 710. The image is assigned at block 712. With process branch 2, a similar inquiry is made as to the resolution of the stored image at block 714. The image as then resized in a similar fashion as to that described above at either blocks 716 or 718. The image is not rotated in this case. Instead, after it is resized, it is cropped to 128×120 pixels at block 720. This cropping results in bands on the top and bottom of the image as previously described. The image is then assigned to the terminal function at block 722. In branch number 3, the resolution is determined at block 724. Again, it is resized to 160×120 pixels from 320×240 pixels at block 726, and from 640×480 pixels at block 728. Regardless of the resizing, or whether it is resized or not, it is rotated 180° at block 730. The image is cropped at block 732, and assigned to the terminal function at block 734. Finally, at processing branch 4, the resolution is again checked in a similar fashion as before at block 736. Resizing occurs at block 738 or block 740, as described in the other program branches. Regardless of the particular resizing process, the image is rotated 90° clockwise to 120×160 pixels, at block 742. The image is then assigned to the appropriate terminal function at block 744.

FIG. 8 illustrates a process in a similar manner to FIG. 7. In FIG. 8, it is assumed that images are stored in portrait and the device will display images in a portrait orientation when assigned to a terminal function. Such will be the case of "mobile phone" type mobile devices. Again, at block 802 a user indication of the top of an image being displayed is received. In program branch 1, resolution is determined at block 804. A 240×320 pixel image is resized to 120×160 pixels at block 806. A 480×640 pixel image is resized to 120×160 pixels at block 808. Otherwise the image is not resized. The image is assigned to the terminal function at block 808. For program branch 2, the resolution is again determined, this time at block 810. It is resized to 120×160 pixels from 240×320 pixels at block 812 and from 480×640 pixels at block 814. Regardless of the resize, the image is rotated 90° clockwise to 160×120 pixels at block 816. In the case of program branch 2, the image is cropped to 128×120 pixels at block 818. Again, this cropping results in bands on the top and bottom of the image. The image is assigned to the terminal function at block 820. At program branch 3, a resolution check is made at block 822. Resizing occurs at block 824 block 826, in a similar fashion as previously described. Regardless of the resizing, the image is rotated 90° counter-clockwise to 160×120 pixels at block 828. For this branch, the image is again cropped to 128×120 pixels (16 pixels per side) at block 830. The image is assigned to the appropriate terminal function at block 832. At program branch 4, in FIG. 8, the image is primarily upside down. (It may also need to be resized.) The resolution is determined at block 834. If the stored image is 240×320 pixels, the image is resized to 120×160 pixels at block 836. If the stored image is 480×640 pixels, it is resized to 120×160 pixels at block 838. In either case, or if it is already stored at 120×160 pixels, as in previous examples, it is rotated 180° at block 840. The image is then assigned to the appropriate terminal function at block 842.

Mobile devices such as mobile phones with built-in imaging systems or cameras often allow a user to assign images to various communication functions, and to send images to other uses via the phone application. The present invention allows a device with both communication and imaging functions to be used more like a traditional camera in acquiring images. The changing of menu orientations can be integrated into the function of the phone as previously described. Additionally, the assignment of images or the sending of pictures as it might be termed to various telephone applications can be easily integrated into the menu structure of a mobile phone type device. The types of menu structures available in mobile terminals are almost infinite, and can be modified and adjusted to meet engineering considerations in any particular device. The cropping, resizing, and rotating of images to account for different orientations, resolutions, and other display attributes can easily be accomplished with controls that are readily integrated into the menu structure of a mobile terminal.

For example, a user can be presented with a menu item to initiate sending an image to a particular phone application. Selecting this menu item can result in the display of a "send to" menu, with options such as "new phone book contact," "contact list," "local album," or "online album." These options can be selected to produce further submenus. The processing of the image as disclosed herein can be accomplished as part of the process of navigating the appropriate menu structure. Pictures sent to a local album can then be assigned to functions such as screen savers and wall paper functions. Additionally, messages can be sent over the network either to a new contact by entering a number, or a contact from a local phonebook or contact list, and images can be attached, possibly with sound, voice memos, and the like. The opportunity to rotate, resize, or scale, and crop images can be added to the send function, to allow users to format an image appropriately for the recipient.

Although the invention has been shown and described in considerable detail with respect to a few exemplary embodiments, it will be readily understood by those skilled in the art that many embodiments and implementations are possible, since various modifications, omissions, and additions may be made to disclosed embodiments without materially departing from the teachings herein, or the scope of the appended claims. In the appended claims, means-plus-function clauses are intended to cover the structures described herein as performing the recited function and not only structural equivalents, but also equivalent structures. Only clauses which expressly use the word "means" are intended to be read as means-plus-function clauses.

We claim:

1. In a mobile device operable to perform both an imaging function and terminal functions, a method of processing an image produced by the imaging function for assignment to a terminal function, the method comprising:

receiving a first user indication requesting that the image be assigned to the terminal function, the image having at least one display attribute that makes it at least in part unsuitable for use with the terminal function;

altering the at least one display attribute of the image using a second user input indicating the location of a specific area of the image on a display screen so that the image is more suitable for use with the terminal function; and assigning the image to the terminal function.

2. The method of claim 1 wherein the altering of the at least one display attribute comprises at least one of resizing, cropping, and rotating the image.

3. The method of claim 2 wherein the at least one of resizing, cropping, and rotating is accomplished so that a landscape image can be viewed in a portrait orientation.

4. The method of claim 3 wherein the terminal function comprises at least one of a group consisting of a phonebook function, a caller ID function, a screen filler function, and a send function.

5. The method of claim 2 wherein the terminal function comprises at least one of a group consisting of a phonebook function, a caller ID function, a send function, and a screen filler function.

6. The method of claim 1 wherein the terminal function comprises at least one of a group consisting of a phonebook function, a caller ID function, a screen filler function, and a send function.

7. Apparatus operable as a mobile device having both an imaging function and terminal functions, the apparatus comprising:

means for receiving a first user indication requesting that the image be assigned to the terminal function, the image having at least one display attribute that makes it at least in part unsuitable for use with the terminal function;

means for altering the at least one display attribute of the image using a second user input indicating the location of a specific area of the image on a display screen so that the image is more suitable for use with the terminal function; and means for assigning the image to the terminal function.

8. A mobile terminal comprising both an imaging function and terminal functions, the mobile terminal further comprising:

a radio block operable to provide an interface to a wireless communication network;

an imaging device associated with the imaging function;

a visual display operable to present at least a portion of a user interface to a user;

a processor to, at least in part, control the mobile terminal, the processor being operationally connected to the radio block, the imaging device and the visual display; and program code stored within the mobile terminal, the program code operable to, using the processor, control the mobile terminal to receive a first user indication requesting that an image captured by the imaging device be assigned to a terminal function and to alter at least one display attribute of the image using a second user input indicating the location of a specific area of the image on the visual display so that the image is more suitable for use with the terminal function.

9. The mobile terminal of claim 8 wherein the program code causes the mobile terminal to alter the at least one display attribute by performing at least one of resizing, cropping, and rotating the image.

10. The mobile terminal of claim 9 wherein the at least one of resizing, cropping, and rotating the image is accomplished so that a landscape image can be viewed in a portrait orientation on the visual display.

11. The mobile terminal of claim 10 wherein the terminal function comprises at least one of a group consisting of a phonebook function, a caller ID function, a screen filler function, and a send function.

12. The mobile terminal of claim 9 wherein the terminal function comprises at least one of a group consisting of a phonebook function, a caller ID function, a screen filler function, and a send function.

13. The mobile terminal of claim 8 wherein the terminal function comprises at least one of a group consisting of a phonebook function, a caller ID function, a screen filler function, and a send function.

* * * * *